United States Patent
Steinborn et al.

(10) Patent No.: US 11,292,472 B2
(45) Date of Patent: Apr. 5, 2022

(54) METHOD AND CONTROL DEVICE FOR OPERATING A DRIVETRAIN

(71) Applicant: ZF Friedrichshafen AG, Friedrichshafen (DE)

(72) Inventors: Mario Steinborn, Friedrichshafen (DE); Andreas Heinzler, Ravensburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 17/052,891

(22) PCT Filed: May 6, 2019

(86) PCT No.: PCT/EP2019/061484
§ 371 (c)(1),
(2) Date: Nov. 4, 2020

(87) PCT Pub. No.: WO2019/219418
PCT Pub. Date: Nov. 21, 2019

(65) Prior Publication Data
US 2021/0245761 A1 Aug. 12, 2021

(30) Foreign Application Priority Data
May 18, 2018 (DE) .......................... 102018207859.9

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/04* (2013.01); *B60W 10/11* (2013.01);
(Continued)

(58) Field of Classification Search
CPC ...... B60W 30/19; B60W 10/02; B60W 10/11; B60W 10/04; B60W 2710/1005;
(Continued)

(56) References Cited

U.S. PATENT DOCUMENTS 5,436,833 A * 7/1995 Janecke .............. F16H 61/0248
477/120
5,682,790 A * 11/1997 Genise .................. B60W 10/06
74/335

(Continued)

FOREIGN PATENT DOCUMENTS

DE 10 2007 007 257 A1 8/2008
DE 10 2007 043 695 A1 3/2009
(Continued)

OTHER PUBLICATIONS

German Office Action Corresponding to 10 2018 207 859.9 dated May 9, 2019.

(Continued)

*Primary Examiner* — Roger L Pang
(74) *Attorney, Agent, or Firm* — Finch & Maloney, PLLC; Michael Bujold; Jay Franklin

(57) ABSTRACT

A method of operating a motor vehicle drive-train having a drive aggregate, a group transmission and a drive output. The aggregate can couple an input shaft of the transmission which includes main, splitter and range groups. To carry out a shift, a target gear and target rotational speed of the aggregate are calculated for the shift to be carried out. After the initiation of the shift a load reduction is first carried out, then a group of the transmission is disengaged in order to shift the transmission to neutral, after which a group of the transmission is synchronized and to shift out of neutral, the synchronized group is engaged, and then the load is again built up. Initiation of the shift, after calculating the target (Continued)

gear and the target rotational speed, occurs at a point in time when complete performance of a shift is not yet possible.

11 Claims, 2 Drawing Sheets

(51) Int. Cl.
*B60W 10/04* (2006.01)
*B60W 10/11* (2012.01)
*B60W 10/111* (2012.01)
*F16H 59/40* (2006.01)
*F16H 61/04* (2006.01)
*F16H 61/16* (2006.01)
*F16H 61/70* (2006.01)
*F16H 59/36* (2006.01)

(52) U.S. Cl.
CPC ........... *B60W 10/111* (2013.01); *F16H 59/40* (2013.01); *F16H 61/0403* (2013.01); *F16H 61/16* (2013.01); *F16H 61/702* (2013.01); *B60W 2510/0638* (2013.01); *B60W 2510/104* (2013.01); *B60W 2710/021* (2013.01); *B60W 2710/1005* (2013.01); *F16H 2059/366* (2013.01)

(58) Field of Classification Search
CPC ... B60W 2710/021; B60W 2510/0638; B60W 10/06; B60W 2510/104; B60W 10/111; F16H 61/0403

USPC .......................................... 477/110, 111, 108
See application file for complete search history.

(56) References Cited

U.S. PATENT DOCUMENTS

| 6,361,473 | B1* | 3/2002 | Mason ................. B60W 10/06 477/124 |
| 7,976,431 | B2 | 7/2011 | Bader et al. |
| 8,251,867 | B2 | 8/2012 | Reith et al. |
| 8,452,497 | B2 | 5/2013 | Reith et al. |
| 8,870,712 | B2 | 10/2014 | Steinhorn et al. |
| 2002/0055413 | A1* | 5/2002 | Genise ................. B60W 10/111 477/109 |

FOREIGN PATENT DOCUMENTS

| DE | 10 2008 040 126 A1 | 1/2010 |
| DE | 10 2011 080 849 A1 | 2/2013 |
| DE | 10 2012 203 582 A1 | 9/2013 |
| EP | 0 578 398 A2 | 1/1994 |
| EP | 0 584 984 A1 | 3/1994 |
| EP | 2 304 275 B1 | 2/2012 |

OTHER PUBLICATIONS

International Search Report Corresponding to PCT/EP2019/061484 dated Jul. 25, 2019.
Written Opinion Corresponding to PCT/EP2019/061484 dated Jul. 25, 2019.

* cited by examiner

METHOD AND CONTROL DEVICE FOR OPERATING A DRIVETRAIN

This application is a National Stage completion of PCT/EP2019/061484 filed May 6, 2019, which claims priority from German patent application serial no. 10 2018 207 859.9 filed May 18, 2018.

FIELD OF THE INVENTION

The invention relates to a method and a control device for operating a drive-train of a motor vehicle.

BACKGROUND OF THE INVENTION

From the prior art drive-trains of motor vehicles are known, which have a group transmission as their transmission. A group transmission comprises a main group, a splitter group in drive connection upstream from the main group and/or a range group in drive connection downstream from the main group. The main group is also called the main transmission. Shifting processes in the splitter group and in the range group can typically be carried out in a synchronized manner. Typically, shifting processes in the main group can be carried out without synchronization.

From DE 10 2007 007 257 A1 a method for operating a drive-train with a group transmission is known. From this prior art, it is known to use an electric machine during shifting processes in the group transmission as synchronizing means, a synchronization aid or a shifting aid.

From EP 2 304 275 B1 a method for carrying out a gearshift in an automatic transmission of a utility vehicle is known. From this prior art, it is known that for the shifting process a transmission control system determines on the one hand a target gear and on the other hand a target rotational speed associated with the target gear as a function of certain parameters, such that when a determined shifting rotational speed is reached the shifting process is carried out. In this case the shifting rotational speed is determined in such manner that a complete shift is possible, i.e. after the shift has been initiated the shift can be implemented in full.

As a result of the fact that according to the prior art a shift can only be initiated if the shift can also be completed, before the shift is initiated, synchronization for a group of the group transmission that is to be shifted first has to take place.

In methods known from the prior art, synchronization takes place by way of the drive aggregate, the clutch connected between the drive aggregate and the transmission input shaft, or a transmission brake that acts in particular on the transmission input shaft. The result of this is that the actual target rotational speed of the drive aggregate often cannot be reached.

There is a need to propose a method for operating a drive-train with a group transmission, in which method, when carrying out a shift, a target rotational speed of the drive aggregate can be produced reliably.

SUMMARY OF THE INVENTION

Starting from there, the purpose of the present invention is to provide a new type of method for operating a drive-train of a motor vehicle and a control device for carrying out the method.

This objective is achieved by a method for operating a drive-train according to the independent claim(s).

According to the invention, the shift is initiated after calculating the target gear and the target rotational speed at a point in time when the shift cannot yet be carried out completely. After the initiation of the shift and after the load reduction and also after shifting the group transmission to neutral, according to the invention the calculated target rotational speed is set at the drive aggregate. According to the invention, the group transmission remains in neutral and the calculated target rotational speed is maintained at the drive aggregate until, as a result of a change of the rotational speed at the drive output, the group of the group transmission that is to be synchronized has been synchronized, and immediately after this synchronization in the transmission the synchronized group is engaged and the group transmission is shifted out of neutral.

With the present invention it is proposed to initiate the shift prematurely at a point in time when it is not yet possible to carry out the shift completely.

After the initiation of the shift, the load reduction and the change of the group transmission to neutral take place imperatively, the drive aggregate is adjusted to the target rotational speed. The group transmission and the drive aggregate remain in this condition until, as a result of a change of the drive output rotational speed, the group of the group transmission that is to be synchronized is actually synchronized, and after that the synchronized group is engaged, following which the group transmission is shifted out of neutral. Thus, the rotational speed of the drive aggregate is held at the desired target rotational speed during a neutral phase of the group transmission and the system waits until, by virtue of the driving dynamics, namely a change of the vehicle's speed, the synchronization of the group of the group transmission that is to be synchronized has taken place and the transmission can be shifted out of neutral. In this way the target rotational speed can be reached safely and reliably.

According to an advantageous further development of the invention, the group transmission remains in neutral and the calculated target rotational speed is maintained at the drive aggregate until, within a defined time interval after a change of the rotational speed at the drive output, the group of the group transmission to be synchronized has been synchronized, and if the synchronization in the transmission does not take place within the defined time interval, a new target gear is selected and/or the rotational speed of the drive aggregate is adapted in order to achieve synchronization. If the synchronization at the drive output is not successful, then either another target gear can be engaged or the gearshift initiated can be completed by synchronization of the transmission input from the drive aggregate side.

Preferably, in parallel with the setting of the target rotational speed at the drive aggregate while the group transmission is in neutral, a further group of the group transmission is shifted and/or in the main transmission a shift gate is changed to a target position. While the group transmission is in neutral, further groups of the transmission to be shifted for the gearshift to be carried out are shifted and/or in the main transmission the shift gate is changed to the target position. Accordingly, while in neutral, the group transmission is prepared to the extent that by closing the group of the group transmission that is to be synchronized, the transmission can be moved out of neutral rapidly.

According to an advantageous further development, the group of the group transmission synchronized by the transmission-drive-output-side synchronization is engaged in order to shift out of neutral when the rotational speed at the drive output multiplied by the gear ratio of the target gear reaches a rotational speed window that extends around the calculated target rotational speed. Preferably, the rotational speed window is defined by a positive offset and a negative offset relative to the calculated target rotational speed, such that the positive offset and/or the negative offset is/are determined depending on whether in the group transmission an upshift or a downshift is to be carried out in traction operation or in overdrive operation. By closing the synchronized group of the group transmission when the defined rotational speed window for the target rotational speed of the transmission input shaft has been reached, which corresponds to the rotational speed at the drive output multiplied by the gear ratio of the target gear, the transmission can be moved out of neutral reliably. By selecting the corresponding offsets, the shift can be optimally coordinated, and this indeed while avoiding or eliminating tooth-on-tooth situations at a shifting element of a group of the transmission that is to be closed, in particular at a shifting element of the main group.

In an advantageous further development, while the group transmission is in neutral and the calculated target rotational speed has been set at the drive aggregate, the clutch is closed far enough for a rotational speed of the input shaft to match the rotational speed of the drive aggregate. Then, when the synchronized group of the group transmission is shifted the clutch, via which the drive aggregate is coupled to the input shaft of the group transmission, is preferably opened. If the clutch is opened during the shifting of the group of the group transmission being synchronized, the comfort while carrying out the gearshift can be increased.

The control device according to the invention for operating a drive-train of a motor vehicle is defined in the independent claim(s).

BRIEF DESCRIPTION OF THE DRAWINGS

Preferred further developments emerge from the subordinate claims and from the description that follows. Example embodiments of the invention, to which it is not limited, are explained in greater detail with reference to the drawings, which show:

DETAILED DESCRIPTION OF THE PREFERRED EMBODIMENTS

The present invention relates to a method for operating a drive-train of a motor vehicle and to a control device for carrying out the method.

Figure 1:
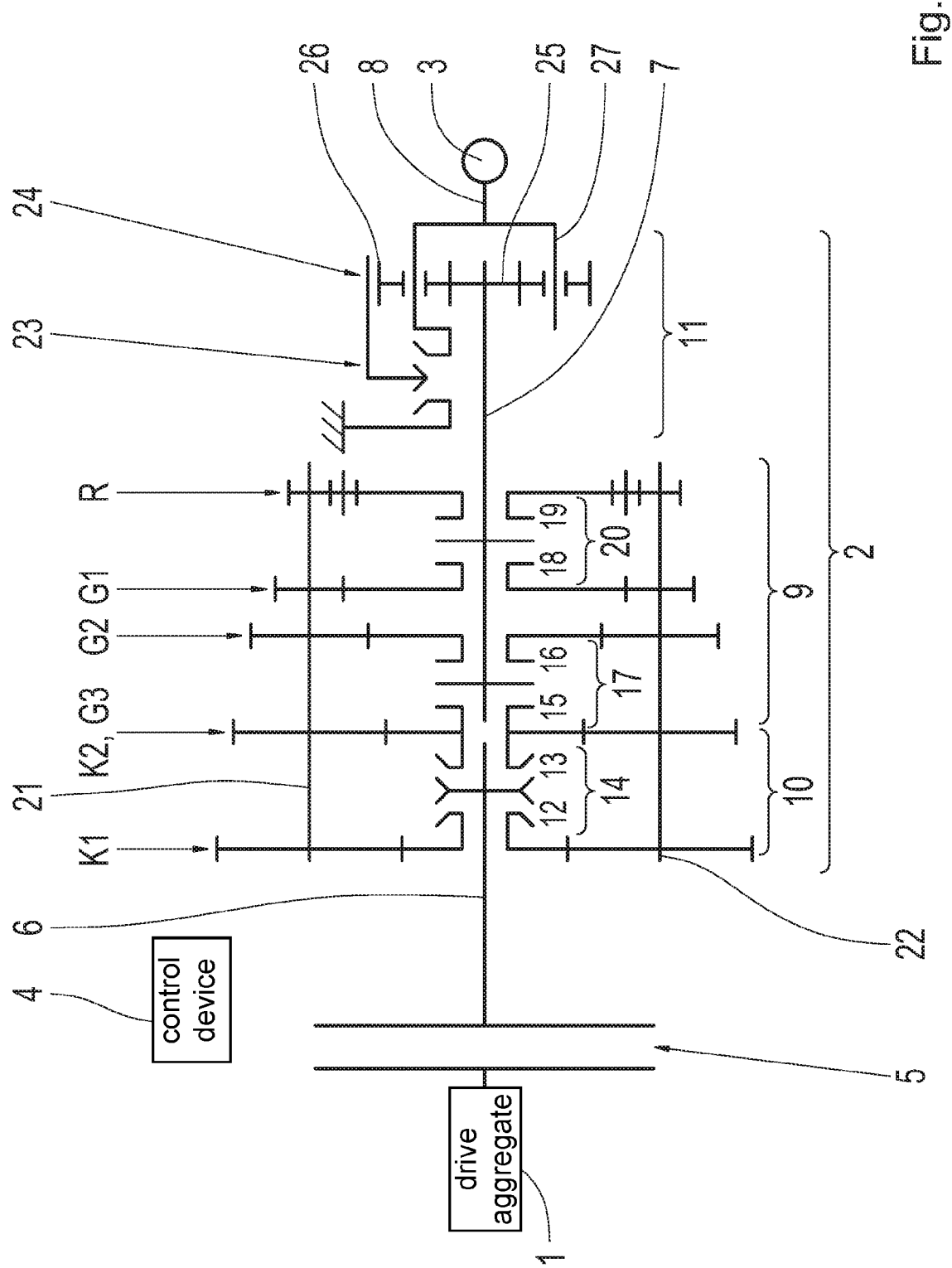
FIG. 1: An example of a layout of a drive-train of a motor vehicle with a group transmission.

FIG. 1 shows the layout of a drive-train of a motor vehicle with a drive aggregate 1, a group transmission 2 and a drive output 3. In addition FIG. 1 shows a control device 4 for operating the group transmission 2. The drive aggregate 1 can be coupled by a separator clutch 5, also called a starting clutch, to an input shaft 6 of the group transmission 2. The drive output 3 is coupled to an output shaft 8 of the group transmission 2.

In the example embodiment shown, the group transmission 2 comprises a main group 9, a splitter group 10 drive-connected upstream from the main group 9 and a range group 11 drive-connected downstream from the main group 9. The group transmission 2 can also comprise only the splitter group 10 or the range group 11 apart from the main group 9.

In the example embodiment shown, the main group 9 of the group transmission 2 is a direct-gear transmission of countershaft design, with two countershafts 21, 22. In the example embodiment shown, the main group 9 is made with three gear steps G1, G2 and G3 for forward driving and with one gear step R for driving in reverse. Loose wheels of the gear steps G1, G2 and R are in each case mounted to rotate on a main shaft 7 and can be engaged by associated shifting elements 15, 16, 18 and 19 in the form of claw clutches.

The associated fixed wheels are arranged rotationally fixed on the countershafts 21, 22. The two shifting elements 15, 16 and the two shifting elements 18, 19 form in each case a shifting packet 17 and 20 respectively. The main group 9 can be shifted without synchronization.

In the example embodiment shown, the splitter group 10 of the group transmission 2 is made with two steps and is also of countershaft design, wherein the two gear ratio steps K1 and K2 of the splitter group 10 form two switchable input constants of the main group 9. The two gear ratio steps K1, K2 have a small ratio difference.

The loose wheel of the first gear ratio step K1 is mounted and can rotate on the input shaft 6. The loose wheel of the second gear ratio step K2 is mounted and can rotate on the main shaft 7. The fixed wheels of the two gear ratio steps K1, K2 of the splitter group 10 are respectively arranged in a rotationally fixed manner on the countershafts 21, 22 of the main group 9, which are extended on the input side. Shifting elements 12, 13 of synchronized design, i.e. so-termed synchronous shifting elements of the splitter group 10, are combined in a common shifting packet 14.

The optional range group 11 of the group transmission 2 arranged downstream from the main group 9 is also of two-step design, but in the form of a planetary gearset 24. The sun gear 25 is connected rotationally fixed to the main shaft 7 of the main group 9 which is extended on the output side. The planetary carrier 27 is coupled rotationally fixed with the output shaft 8 of the group transmission 2. The ring gear 26 is connected to a shifting packet 23 which has two synchronized shifting clutches, by means of which the range group 11 can be selectively shifted in a synchronized manner, either by connecting the ring gear 26 to a fixed part of the housing into a 'slow' driving range L or, by connecting the ring gear 26 to the planetary carrier 27 into a 'fast' driving range S. The range group 11 can be shifted in a synchronized manner.

The present invention now relates to a method for operating a drive-train with a group transmission 2, namely for carrying out a shift from a current gear to a target gear of the group transmission 2.

In order to carry out a shift in the group transmission 2, namely a shift from a current gear to a target gear of the group transmission 2, for the shift to be carried out the control system first calculates the target gear and a target rotational speed of the drive aggregate that is appropriate for the target gear. Typically, the calculation of the target gear takes place as a function of the driver's wish and as a function of the vehicle dynamics, wherein details for the calculation of a target gear of a shift to be carried out will be familiar to one who has knowledge of the field, to whom this is addressed. Likewise, the calculation of a target rotational speed of the drive aggregate 1 for a shift to be carried out will be familiar to the knowledgeable person.

According to the invention, it is proposed that after calculating the target gear and the target rotational speed, the shift to be carried out is initiated at a point in time at which a complete shift is actually not yet possible, i.e. at which the target rotational speed of the drive aggregate has not been reached at the transmission input. Compared with methods known from the prior art, the control system accordingly carries out a premature initiation of the shift to be performed. After the shift has been initiated, a load decrease first takes place by way of the drive aggregate 1 and/or the clutch 5, and then the group transmission 2 is shifted to neutral in that a group of the group transmission 2 is disengaged.

The disengagement of a group of the group transmission 2 can also be called the disconnection or opening of the group of the group transmission 2.

After the load has been reduced and the group transmission 2 has been shifted to neutral, this condition of the group transmission 2 is maintained, i.e. the group transmission remains in neutral and the calculated target rotational speed set at the drive aggregate 1 is maintained until, as the result of a rotational speed change at the drive output 3, the group of the group transmission to be synchronized has been synchronized, and immediately after this synchronization, this time on the transmission output side, the synchronized group is engaged and the group transmission is shifted out of neutral.

The engagement of the synchronized group of the group transmission 2 can also be called the connection or closing of the group of the group transmission 2.

For the purposes of the invention it is thus necessary to set and maintain, at the drive aggregate 1, a desired target rotational speed while the group transmission 2 is in neutral, and this indeed until the dynamics of the vehicle make it possible to close the group of the group transmission 2 that is to be synchronized. The synchronization of the group of the group transmission 2 to be synchronized takes place by passively changing the speed of the vehicle, for example when driving uphill or downhill, i.e. by changing the rotational speed at the transmission output 8 and not, as is usual in common practice, by actuating the clutch 5 or by actuating a transmission brake (not shown).

After the load has been reduced, the group transmission has been shifted into neutral and the target rotational speed has been set at the drive aggregate 1, the clutch 5 is actuated in such manner that it transmits a torque such that the rotational speed of the input shaft 6 of the group transmission 2 corresponds to the target rotational speed of the drive aggregate 2. When the gear of the synchronized group of the group transmission 2 has been engaged or connected, the clutch 5 can either remain in its closed position or, to increase comfort, it can preferably be opened.

Figure 2:
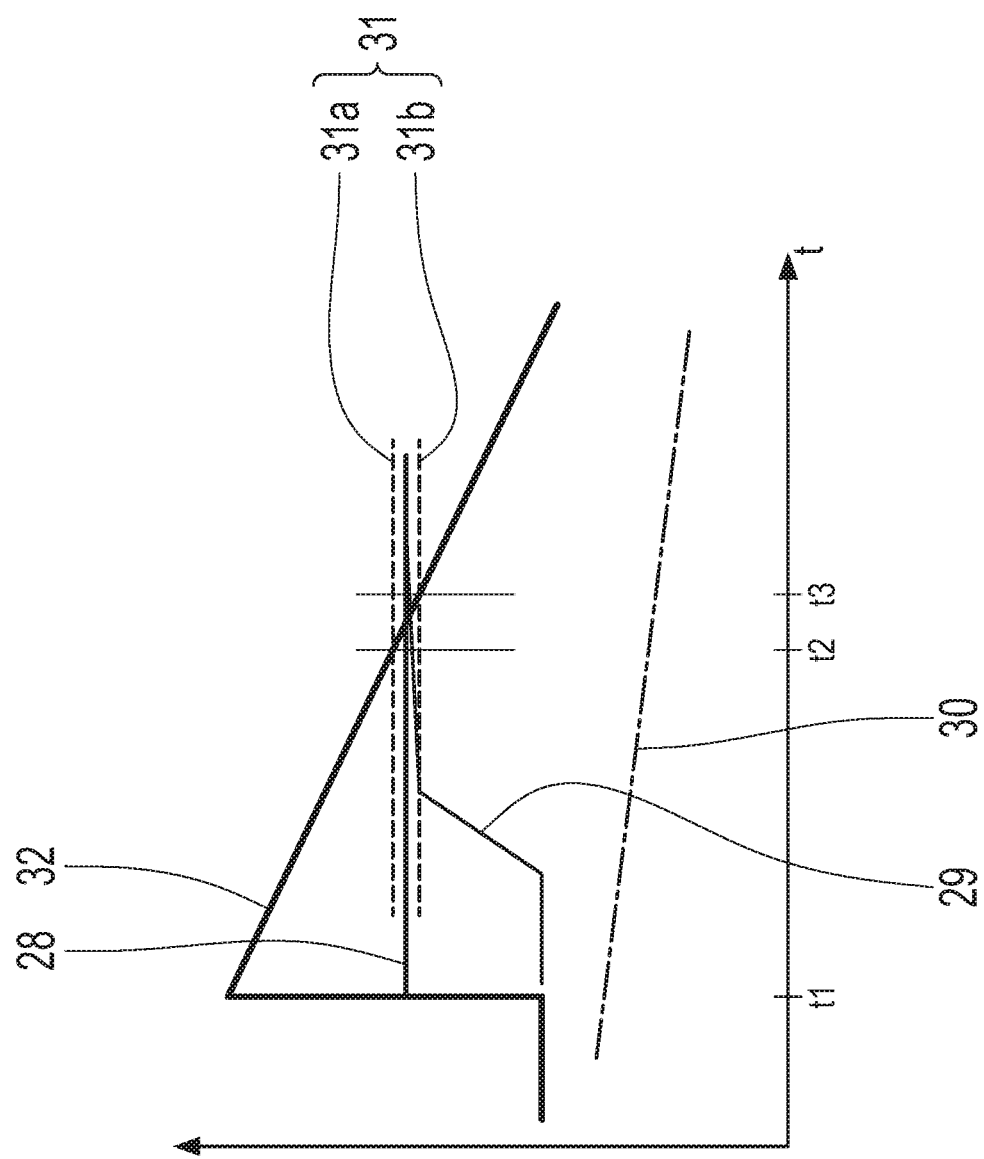
FIG. 2: A time diagram to clarify the invention.

Further details of the invention are described below with reference to FIG. 2, which shows the variations with time of a number of time curves 28, 29, 30 and 32. In FIG. 2 the curve 28 shows the variation of the rotational speed of the drive aggregate 1. The curve 29 depicts the variation of the rotational speed at the input shaft 6 of the group transmission 2. The curve 30 shows the variation of the rotational speed at the drive output 3 or output shaft 8 of the group transmission 2. The rotational speed curve 32 depicts, over time, the variation of the target rotational speed for the input shaft 6 of the group transmission 2, which corresponds to the product of the rotational speed at the drive output 3 and the gear ratio of the target gear of the gearshift to be carried out. In addition a rotational speed window 31 is shown, which is defined by an upper limit value 31*a* and a lower limit value 31*b*.

At time t1 a shift request is made and accordingly, at time t1 the target gear and the target rotational speed of the drive aggregate 1 appropriate for the target gear are calculated. Furthermore, in FIG. 2 directly at time t1 the shift to be carried out is initiated and for this, as already mentioned, the load is reduced and the group transmission 2 is shifted to neutral. At time t1 the target rotational speed for the transmission input shaft 6 jumps upward since at time t1 the gear ratio changes to that of the new target gear of the shift to be carried out.

FIG. 2 shows the curve shapes for a downshift to be carried out while driving uphill.

At time t1 or immediately after time t1, the group transmission 2 is in neutral. Furthermore at time t1, as the shape of curve 28 shows, the rotational speed of the drive aggregate 1 corresponds to the target rotational speed. Beginning at time t1, the transmission 2 is then held in that condition so the group transmission 2 remains in neutral. The drive aggregate 1 is held at the target rotational speed 28, and the clutch 5 is closed far enough for the rotational speed of the transmission input shaft 6 of the group transmission 2 to correspond to the target rotational speed of the drive aggregate 1.

In neutral, the rotational speed of the drive output 3 and the rotational speed of the output shaft 8 of the group transmission 2 now changes in accordance with the curve 30 due to the uphill driving of the motor vehicle. Furthermore, this reduces the target rotational speed for the input shaft 6 of the group transmission 2, which corresponds to the product of the rotational speed of the drive output 3 and the gear ratio of the target gear. When this target rotational speed for the input shaft 6 of the group transmission 2 reaches a rotational speed window 31 that extends around the target rotational speed 28 of the drive aggregate 1, and indeed in FIG. 2 intersects the upper limit value 31*a*, which in FIG. 2 takes place at time t2, the now synchronized group of the group transmission 2 leaves neutral by being shifted or engaged or closed.

Before the time-point t2, and indeed between times t1 and t2, between which the group transmission 2 is in neutral and between which the rotational speed of the drive aggregate 1 is set at the target rotational speed of the gearshift to be carried out, further groups in the group transmission 2 can be prepared for the gearshift, so it is possible to shift the splitter group or the range group if necessary and/or in the main transmission to change a shift gate to a target position for the shift change to be carried out.

When at time t2 the transmission is still in neutral and the target rotational speed for the input shaft 6 of the group transmission 2 reaches the rotational speed window 31, neutral can be left immediately by shifting or closing the now synchronized group of the group transmission 2, so that the target gear can be engaged within the shortest time when the target rotational speed of the drive aggregate 1 is reached.

At the latest at time t3, at which the target rotational speed of the input shaft 6 of the group transmission 2 would leave the rotational speed window 31 again, the shift in the group transmission 2 is completed.

Leaving neutral takes place when, as already described with reference to FIG. 2, the target rotational speed of the input shaft 6 of the group transmission 2, which corresponds to the product of the drive output rotational speed and the gear ratio of the target gear, reaches the rotational speed window 31. The rotational speed window 31 is positioned around the target rotational speed 28 of the drive aggregate 1, and this indeed with a positive offset to the upper limit value 31*a* and a negative offset to the lower limit value 31*b*. The positive offset and the negative offset can be quantitatively the same, but they can also be different from one another. In particular it is provided that the rotational speed window 31 is defined by a positive offset and a negative offset such that both the positive offset and the negative offset are determined by whether in the group transmission an upshift or a downshift in traction operation or in overdrive is being carried out. The offsets for upshifts, downshifts, traction operation and overdrive operation are stored in the control unit 4.

By selecting the offset it is also possible to avoid or eliminate a tooth-on-tooth position at an interlocking shifting element that has to be closed. By virtue of the vehicle's dynamics and the maintenance of the rotational speed of the drive aggregate 1 at the target rotational speed, intersecting rotational speed rotational speed behaviors occur at a shifting element that is to be closed, whereby tooth-on-tooth positions can either be avoided or eliminated on the drive output side.

As already mentioned, FIG. 2 shows the curves obtained when a downshift is carried out while driving uphill. The invention is not limited to this application. Rather, the invention can also be used when an upshift has to be carried out while driving downhill. In that case the curve shape runs not downward but upward, as also does the shape 30 of the drive output rotational speed.

The invention also relates to a control device 4 for carrying out the method. The control device implements the method by control means. The control device 4 initiates a shift prematurely after the target gear and the target rotational speed have been calculated, at a point in time when complete performance of the shift is actually not yet possible, i.e. when the target rotational speed of the drive aggregate 1 has not yet been reached at the transmission input. After the initiation of the shift, the control device reduces the load and changes the group transmission to neutral, and in addition sets the calculated target rotational speed at the drive aggregate 1. The control device 4 keeps the group transmission in neutral and maintains the drive aggregate 1 at the calculated target rotational speed until, owing to a change of the rotational speed at the drive output 3, the group of the group transmission 2 to be synchronized has been synchronized, and immediately after this transmission-output-side synchronization the synchronized group of the group transmission 2 is engaged or closed so that then the group transmission can move out of neutral.

INDEXES

1 Drive aggregate
2 Group transmission
3 Drive output
4 Control device
5 Separator clutch
6 Input shaft
7 Main shaft
8 Output shaft
9 Main group
10 Splitter group
11 Range group
12 Synchronous shifting element
13 Synchronous shifting element
14 Shifting packet
15 Shifting element
16 Shifting element
17 Shifting packet
18 Shifting element
19 Shifting element
20 Shifting packet
21 Countershaft
22 Countershaft
23 Shifting packet
24 Planetary gearset
25 Sun gear
26 Ring gear
27 Planetary carrier
28 Curve shape/Rotational speed of the drive aggregate
29 Curve shape/Rotational speed of the transmission input shaft
30 Curve shape/Rotational speed of the drive output
31 Rotational speed window
31a Upper limit value of the rotational speed window
31b Lower limit value of the rotational speed window
32 Curve shape/Target rotational speed of the transmission input shaft

The invention claimed is:

1. A method for operating a drive-train of a motor vehicle with a control device, the drive train having a drive aggregate, a group transmission and a drive output,
the drive aggregate being couplable, via a clutch, to an input shaft of the group transmission,
the group transmission having a main group, and at least one of a splitter group, that is drive-connected upstream from the main group, and a range group, that is drive-connected downstream from the main group,
to carry out a shift from a current gear to a target gear of the group transmission, the target gear and a target rotational speed of the drive aggregate are calculated by the control device,
after initiation of the shift, a load reduction is carried out, then a first group of the group transmission is disengaged in order to shift the group transmission to neutral, after which a second group of the group transmission is synchronized and to move out of neutral, the synchronized second group is engaged, and then the load is built up,
the method comprising:
calculating, with the control device, the target gear and the target rotational speed,
subsequent to the calculation, initiating the shift with the control system at a point in time when complete performance of a shift is not yet possible,
reducing the load and shifting the group transmission to neutral by disengaging the first group of the group transmission,
subsequently setting the calculated target rotational speed at the drive aggregate,
with the control device, maintaining the group transmission in neutral and maintaining the calculated target rotational speed, which is set at the drive aggregate, until the second group of the group transmission is synchronized as a result of a change of a rotational speed at the drive output, and
immediately after synchronization of the second group of the group transmission, engaging the synchronized second group and shifting the group transmission out of neutral.

2. The method according to claim 1, further comprising maintaining the group transmission in neutral and maintaining the calculated target rotational speed set at the drive aggregate until, within a defined time interval and as a result of the change of the rotational speed at the drive output, the second group of the group transmission is synchronized, whereas, if synchronization of the second group of the group transmission does not occur within the defined time interval, at least one of selecting a new target gear, and adapting the rotational speed of the drive aggregate in order to achieve synchronization.

3. The method according to claim 1, further comprising, in parallel with the setting of the target rotational speed at the drive aggregate while the group transmission is in neutral, at least one of engaging a third group of the group transmission, and changing a shift gate in the main transmission to a target position.

4. The method according to claim 1, further comprising, if the rotational speed at the drive output multiplied by a gear ratio of the target gear is within a rotational speed window that extends around the calculated target rotational speed, engaging the second group of the group transmission that is synchronized in order to shift out of neutral.

5. The method according to claim 4, further comprising defining the rotational speed window by a positive offset and a negative offset, relative to the target rotational speed of the drive aggregate, at least one of the positive offset and the negative offset is determined by the control device depending on whether the shift from the current gear to the target gear is an upshift or a downshift in traction operation or in an overdrive operation.

6. The method according to claim 1, further comprising when the group transmission is in neutral and the target rotational speed is set at the drive aggregate, engaging the clutch far enough to couple the drive aggregate to the input shaft of the group transmission such that a rotational speed of the input shaft corresponds to the rotational speed of the drive aggregate.

7. The method according to claim 1, further comprising when the synchronized second group of the group transmission is engaged, disengaging the clutch by which the drive aggregate is coupled to the input shaft of the group transmission.

8. The method according to claim 1, further comprising defining the point in time at which complete performance of the shift is not yet possible as being a point in time at which the target rotational speed of the drive aggregate has not been reached at the transmission input.

9. A control device for operating a drive-train of a motor vehicle, the drive train having a drive aggregate, a group transmission and a drive output, the drive aggregate is couplable, via a clutch, to an input shaft of the group transmission, and the group transmission comprises a main group and at least one of a splitter group, that is drive-connected upstream from the main group, and a range group, that is drive-connected downstream from the main group,
  to carry out a shift from a current gear to a target gear of the group transmission, the control device calculating the target gear and a target rotational speed of the drive aggregate, and after initiating the shift, reducing the load, and disengaging a first group of the group transmission to shift the group transmission to neutral, the control device then synchronizes a second group of the group transmission and, to shift out of neutral, engages the synchronized second group and finally builds up the load,
  wherein
  after calculating the target gear and the target rotational speed, the control device initiates the shift from the current gear to the target gear at a point in time at which a complete performance of the shift is not yet possible, after initiating the shift and after the load reduction and after shifting the group transmission to neutral, the control device sets the calculated target rotational speed at the drive aggregate,
  the control device keeps the group transmission in neutral and maintains the calculated target rotational speed at the drive aggregate until, as a result of a change of a rotational speed at the drive output, the second group of the group transmission is synchronized, and immediately after synchronization, the synchronized second group is engaged and the group transmission is shifted out of neutral.

10. The control device according to claim 9, wherein the control device is adapted to
  initiate the shift from the current gear to the target gear after calculating the target gear and the target rotational speed occurs at a point in time when complete performance of the shift is not yet possible,
  set the calculated target rotational speed at the drive aggregate after each of the shift is initiated, and the load is reduced and the group transmission is shifted to neutral,
  maintaining the group transmission in neutral and maintaining the calculated target rotational speed, set at the drive aggregate, until, as the result of the change of the rotational speed at the drive output, the second group of the group transmission is synchronized, and
  immediately after synchronization of the second group, engaging the synchronized second group and moving the group transmission out of neutral.

11. A method of operating a motor vehicle drive-train with a control device, the drive train having a drive aggregate, a group transmission and a drive output, the drive aggregate being couplable, via a clutch, to an input shaft of the group transmission, the group transmission having a main group and at least one of a splitter group and a range group, the splitter being drive-connected upstream from the main group and the range group being drive-connected downstream from the main group, the method for shifting the group transmission from a current gear to a target gear comprising:
  calculating, with the control device, the target gear and a target rotational speed of the drive aggregate for the shift to be carried out;
  subsequently, initiating, with the control device, the shift at a point in time when complete performance of a shift is not yet possible,
  reducing a load and, then shifting the group transmission to neutral by disengaging a first group of the group transmission,
  subsequently, setting, with the control device, the calculated target rotational speed at the drive aggregate,
  maintaining the group transmission in neutral and maintaining the calculated target rotational speed set at the drive aggregate until, as the result of a change of a rotational speed at the drive output, a second group of the group transmission is synchronized, and
  immediately after the synchronization of the second group, engaging the synchronized second group, shifting the group transmission out of neutral and building up the load.

* * * * *